United States Patent

Oya

[15] 3,659,123

[45] Apr. 25, 1972

[54] COMPOSITE CIRCUIT MEMBER INCLUDING AN ELECTRO-STRICTIVE ELEMENT AND CONDENSER

[72] Inventor: Koichi Oya, Haruna-machi, Gunna-gun, Japan

[73] Assignee: Taiyo Yuden Kabushiki Kaisha, Tokyo, Japan

[22] Filed: Dec. 29, 1969

[21] Appl. No.: 888,285

[30] Foreign Application Priority Data

Feb. 14, 1969 Japan....................................44/10410

[52] U.S. Cl.....................................310/8, 310/8.2, 310/9.5, 310/9.8

[51] Int. Cl. ....................................H01v 7/00

[58] Field of Search....................................310/8–8.3, 9.7, 310/9.8, 9.5; 317/101; 331/116

[56] References Cited

UNITED STATES PATENTS

| | | | |
|---|---|---|---|
| 3,222,622 | 12/1965 | Curran et al. | 333/72 |
| 3,416,036 | 12/1968 | Ho | 317/101 |
| 3,486,046 | 12/1969 | Zalar | 310/8 |
| 3,487,318 | 12/1969 | Herman | 329/117 |
| 3,492,513 | 1/1970 | Hollander, Jr. et al. | 310/8.1 |
| 3,513,356 | 5/1970 | Newell | 310/8.1 X |
| 2,483,677 | 10/1949 | Swinehart | 310/9.5 X |
| 3,365,591 | 1/1968 | Koneval et al. | 310/8.2 |
| 3,490,055 | 1/1970 | Cox | 333/70 |

*Primary Examiner*—J. D. Miller
*Assistant Examiner*—Mark O. Budd
*Attorney*—Waters, Roditi, Schwartz & Nissen

[57] ABSTRACT

Driving electrodes and a capacitor are mounted on an electrostrictive base member to form a composite circuit member. The capacitor is covered with a high polymer resin. To improve the characteristics of this circuit member, the electrostrictive characteristics of the base member are restricted to a limited portion and the capacitor is mounted outside of this limited portion.

7 Claims, 8 Drawing Figures

INVENTOR
BY Koichi Oya

COMPOSITE CIRCUIT MEMBER INCLUDING AN ELECTRO-STRICTIVE ELEMENT AND CONDENSER

FIELD OF INVENTION

This invention relates to composite circuit members of the type including an electro-strictive element and a condenser which are formed on a common base plate.

The invention more particularly relates to circuit members of the type which comprises, for example, a ceramic electro-strictive base plate which is subjected at a central portion to a polarization treatment in thickness direction and wherein driving electrodes are formed on opposite surfaces of this portion, and which further includes a condenser element having opposite electrodes provided on opposite surfaces of an edge portion of the base plate or having parallel electrodes provided in adjacent relation on the same surface of said portion of the base plate and wherein these electrodes are coated with a high-polymer resin.

BACKGROUND

A composite circuit member of the above-noted type including an electro-strictive element and a condenser, which has recently been made the subject of patent applications which I have filed, includes an electro-strictive element utilizing thickness direction oscillation. It is so formed that a single ceramic electro-strictive base plate is provided, substantially at its central portion, with opposite electrodes. A condenser element in my earlier circuit member is so formed that the base plate is provided at an edge portion with opposite or parallel electrodes, and the condenser element portion is coated with a high-polymer resin.

The electro-strictive phenomenon is first observed by the polarization treatment, and the electro-strictive base plate of my prior application is such that the material base plate is polarized in thickness direction throughout the whole area thereof. A condenser formed on such a base plate subjected to a polarization treatment throughout the whole surface thereof can be used as a condenser but the same is comparatively low in its Q value and cannot always provide the ideal characteristics although in many cases it is quite satisfactory.

SUMMARY OF INVENTION

The present invention has as an object the provision of an improved circuit member.

In accordance with the invention, there is provided a composite circuit member wherein an electro-strictive element is so formed that an electro-strictive base plate which has been subjected to a polarization treatment in thickness direction, substantially at its central portion only and excluding an end edge portion thereof, is provided with driving electrodes secured thereto; a condenser element being so formed that the base plate is provided at its end edge portion, whereat polarization treatment is excluded, with opposite or parallel electrodes. The condenser element portion is coated with a high-polymer resin.

A condenser obtained in accordance with this invention has a comparatively high Q value and can provide the desired circuit characteristics.

DETAILED DESCRIPTION

One example of the invention will next be described with reference to the accompanying drawing.

Figure 1:
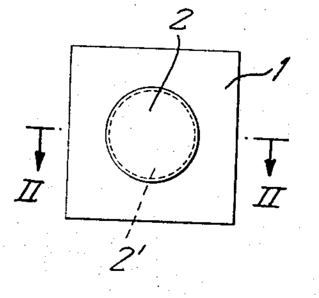
FIG. 1 is a top plan view of a base plate of an electro-strictive material.
Figure 2:
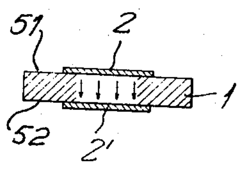
FIG. 2 is a sectional side view of the same along line II—II in FIG. 1.
Figure 3:
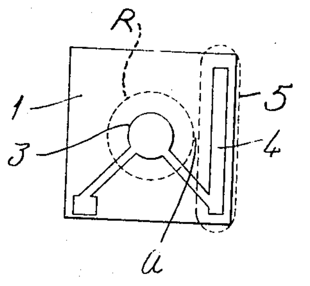
FIG. 3 is a top plan view of the base plate of FIGS. 2 and 2 with additional elements added in accordance with the invention.

In the structure shown in FIGS. 1 and 2, the electro-strictive base plate 1 has not yet been subjected to a polarization treatment. This base plate is provided on its opposite central surfaces S1 and S2 or at least substantially at the center with polarizing electrodes 2 and 2'. These are larger in size than the driving electrodes which are to be formed as shown subsequently with reference to FIG. 3. The base plate is subjected to a polarization treatment in thickness direction as shown by the arrows in FIG. 2 whereby an electro-strictive base plate is obtained. Thereafter, the polarizing electrodes 2 and 2' are removed and the driving electrodes 3 and 3' shown in FIG. 3 are mounted on opposite surfaces of the limited polarized region R at the central portion of the base plate.

The base plate 1 is next provided on its opposite surfaces at an end or edge portion thereof (that is, at a portion which is not polarized) with condenser electrodes 4 and 4' which are secured thereto to form a condenser element. This condenser element is coated with an insulating high-polymer resin 5 such as epoxy resin. The foregoing condenser electrodes can also be formed in parallel with one another on one surface of the base plate at an end portion thereof.

For purposes of illustration, it is now assumed in the foregoing construction that the size of the electro-strictive material base plate is 8 × 7 × 0.5 mm., that each driving electrode is 1.5 mm. in diameter, that each condenser electrode is 0.5 × 5.5 mm., and that the shortest distance between the end portion of the polarized region and the end portion of the condenser electrode is $a$ mm. If the distance $a$ is now changed by varying the area of the polarized region, changes in the Q value of the condenser of the above construction can be measured. The results are shown in FIG. 5 which shows that the Q value of the condenser formed on the edge portion of the base plate bearing the electro-strictive element increases as the distance $a$ is increased.

The foregoing improvement in the Q value cannot be obtained in an electro-strictive base plate of the type that has oscillation other than in thickness direction. If, for example, counter oscillation is utilized, the oscillation also effects the edge portion.

Figures 4, 5, 6, 7, 8:
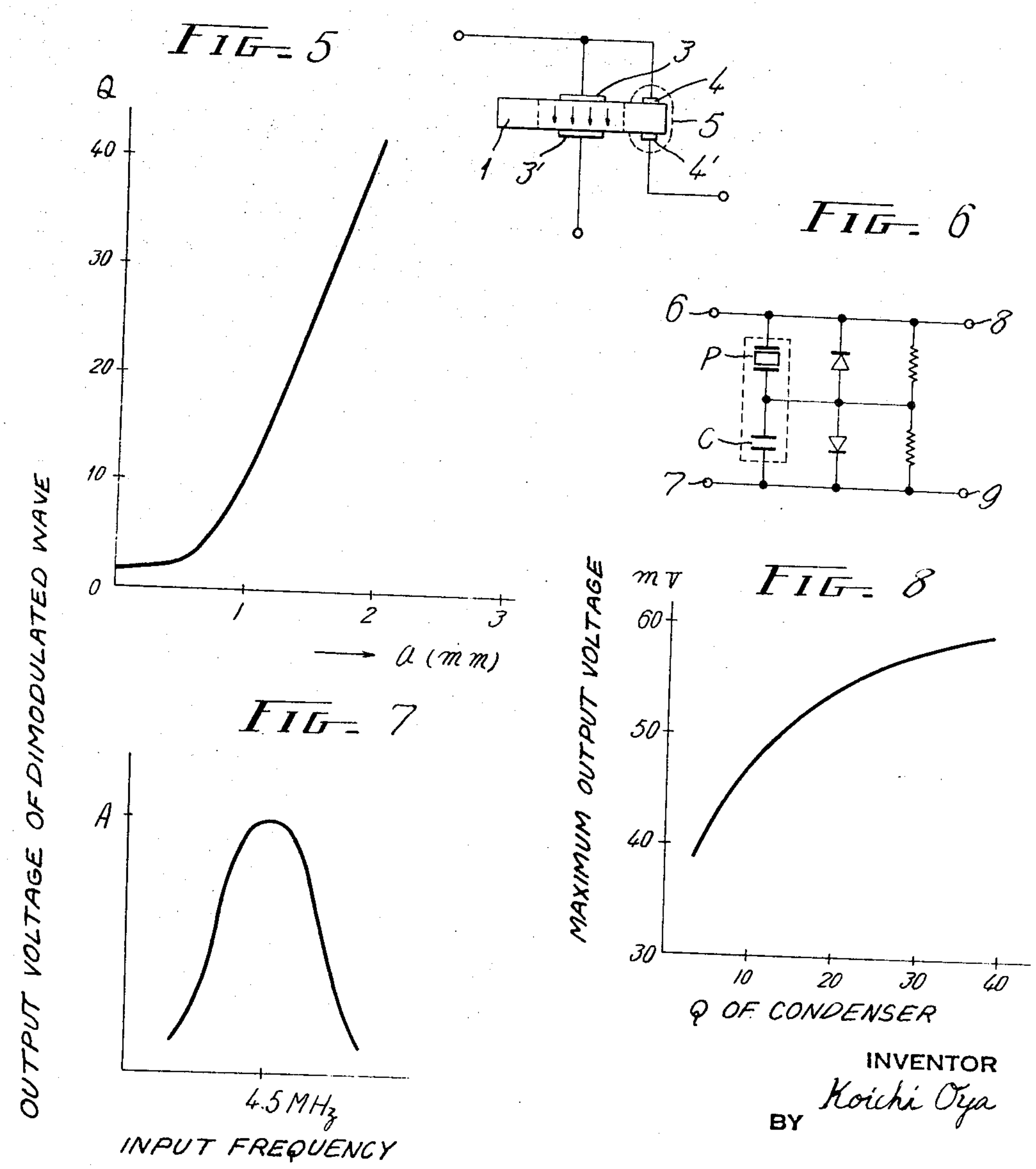
FIG. 4 is a side view of the construction of FIG. 3 showing the electrical connections of the same.
FIG. 5 is a diagram showing the Q value of the circuit member of FIGS. 3 and 4.
FIG. 6 is a diagram showing one example of the use of the circuit member of FIGS. 3 and 4.
FIG. 7 is a diagram showing the input-output characteristic curve of the same.
FIG. 8 is a diagram showing the relationship between the characteristic features of the circuit member of the invention, that is, the Q value thereof and the maximum output voltage.

As an example showing the influence exerted by the increase of the Q value of the condenser, reference is made to the discriminator circuit shown in FIG. 6. Therein an electro-strictive element P and a condenser C are combined in a composite circuit member of the invention. A frequency modulated wave of 500 mV which is of nearly 4.5 MHz comprising 400 Hz modified by 7.5 KHz is applied between input terminals 6 and 7, and the output voltage obtained between output terminals 8 and 9 is measured. There is obtained the curve shown in FIG. 7. The value at the maximum output point A of the curve is largely influenced by the Q value of the condenser and results in the characteristic feature shown in FIG. 8. Specifically, the composite circuit member of this invention greatly improves the maximum output in comparison with a similar composite circuit member formed with an electro-strictive base plate which is polarized throughout the entire surface thereof as in my prior application.

The improved effect of my new composite circuit member is not limited to discriminator circuits but is also useful in ceramic filters and the like.

What is claimed is:

1. A composite circuit member comprising a base member, electrodes on said base member, and an impedor including parts mounted on said base member, said base member including a limited portion having electro-strictive characteristics, the electrodes being located within and the impedor being located outside of said limited portion, said parts being positioned to interact with one another through said base member.

2. A composite circuit member as claimed in claim 1 wherein the base member is flat with opposite surfaces and the electrodes are respectively mounted on the opposite surfaces.

3. A composite circuit member as claimed in claim 2 comprising means connecting the electrodes and impedor.

4. A composite circuit member as claimed in claim 3 wherein the impedor is a capacitor including plates which constitute said parts and are spaced on the opposite surfaces of the base member.

5. A composite circuit member as claimed in claim 2 wherein the limited portion is centrally located in said base member.

6. A composite circuit member as claimed in claim 5 wherein the limited portion is circular.

7. A composite circuit member as claimed in claim 4 comprising a resin coating the plates on said base member.

* * * * *